(No Model.) 3 Sheets—Sheet 1.

A. BLATCHLY.
FRUIT DRIER.

No. 373,808. Patented Nov. 29, 1887.

Witnesses
Geo. H. Strong.
J. H. Nourse

Inventor,
A. Blatchly
By Dewey & Co.
Attorneys (No Model.) 3 Sheets—Sheet 2.

A. BLATCHLY.
FRUIT DRIER.

No. 373,808. Patented Nov. 29, 1887.

Witnesses,
Geo. H. Strong
J. H. Nourse

Inventor,
A. Blatchly
By Dewey & Co.
Attorneys (No Model.) 3 Sheets—Sheet 3.
A. BLATCHLY.
FRUIT DRIER.
No. 373,808. Patented Nov. 29, 1887.
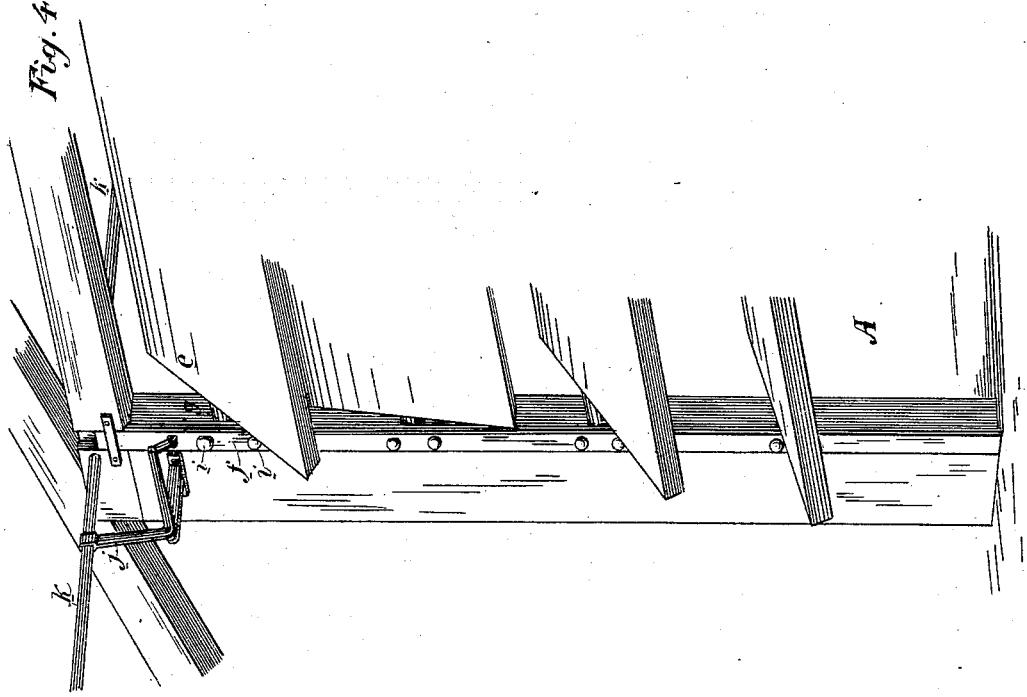

UNITED STATES PATENT OFFICE.

AMBROSE BLATCHLY, OF SAN FRANCISCO, CALIFORNIA.

FRUIT-DRIER.

SPECIFICATION forming part of Letters Patent No. 373,808, dated November 29, 1887.

Application filed August 6, 1885. Serial No. 173,792. (No model.)

*To all whom it may concern:*

Be it known that I, AMBROSE BLATCHLY, of the city and county of San Francisco, State of California, have invented an Improvement in Fruit-Driers; and I hereby declare the following to be a full, clear, and exact description of the same.

My invention relates to improvements in driers; and it consists of horizontal parallel chambers arranged to receive fruit-trays, a heater and blowing or draft mechanism by which the air is caused to flow through the compartments, a means for reversing the current, so that it may be caused to flow from the heaters alternately through one compartment and back through the other, with regulating-doors, by which the current of air is guided and distributed as it passes from one chamber to another, and certain details of construction, which will be more fully explained by reference to the accompanying drawings, in which—

Figure 1:
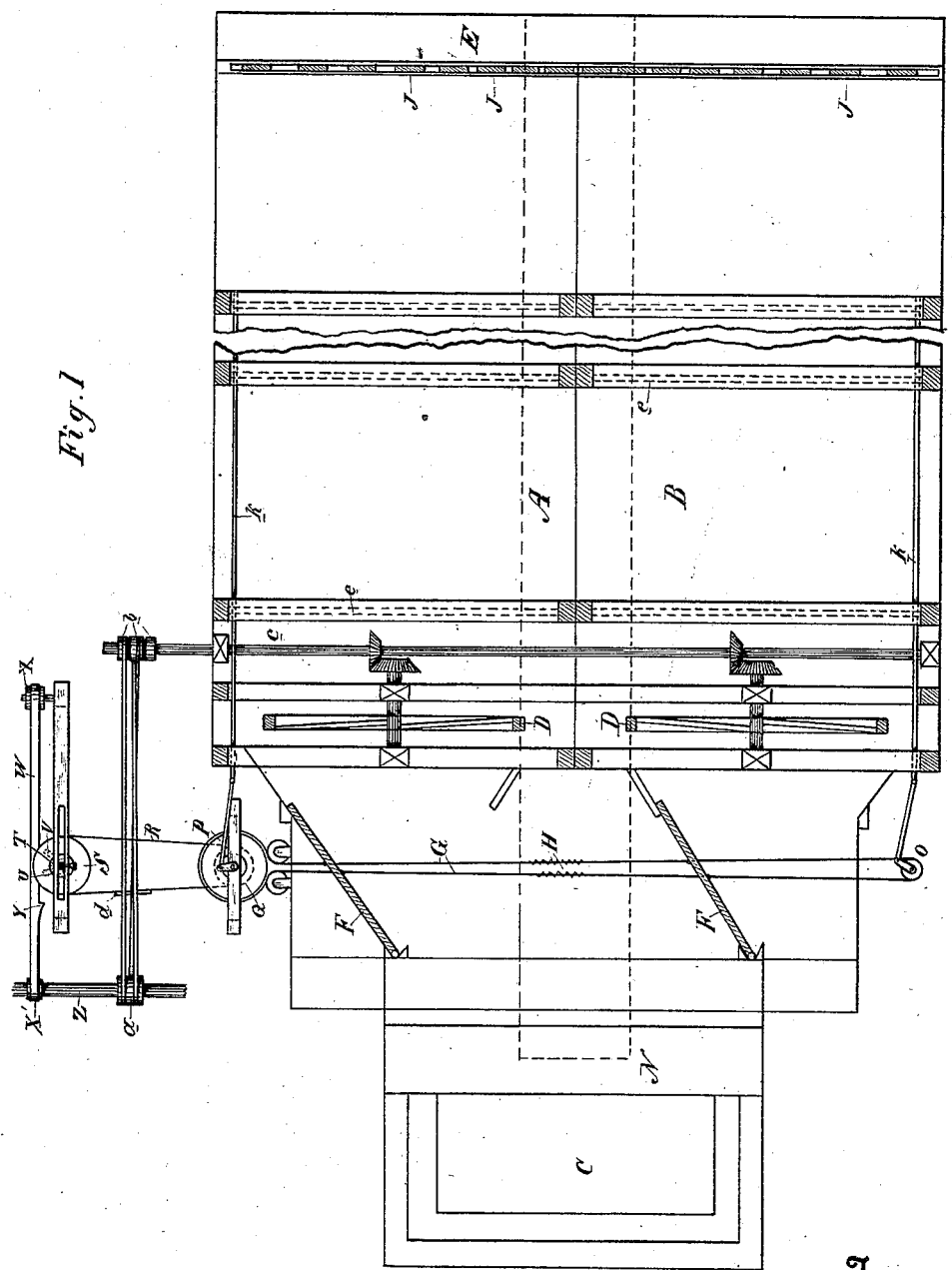
Figure 2:
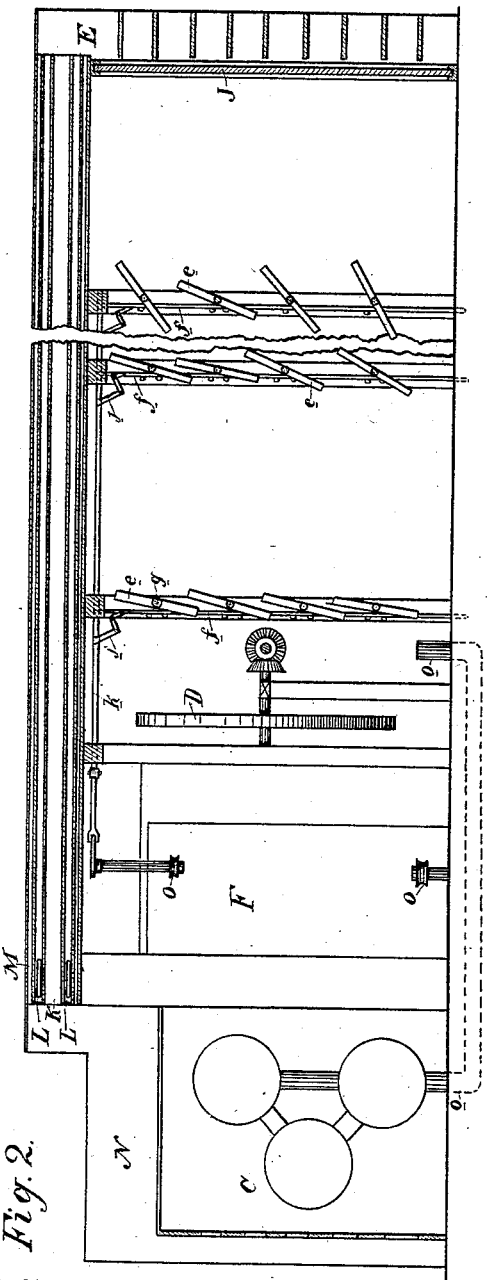
Figure 3:
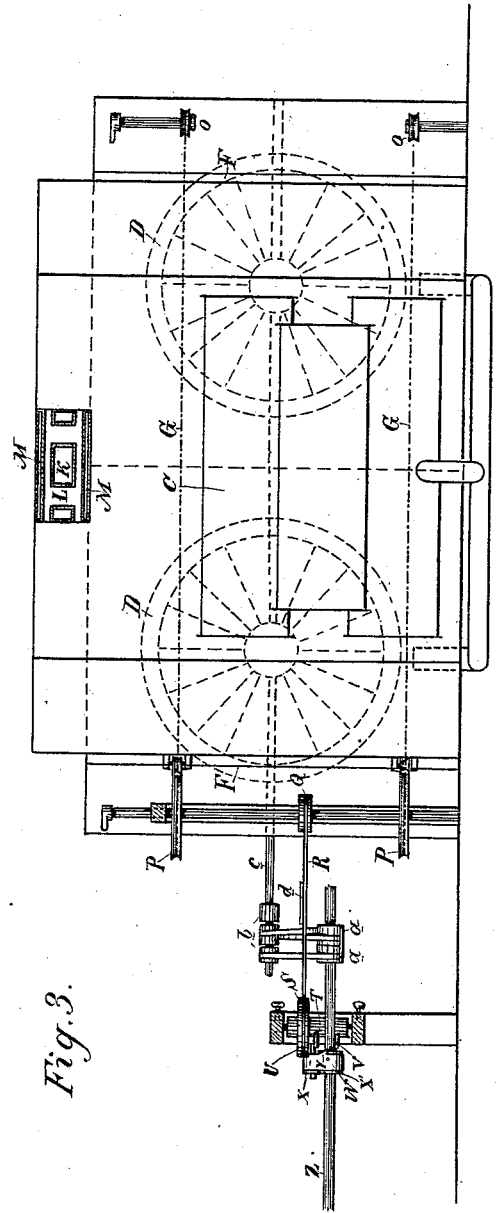

Figure 1 is a plan view of my apparatus. Fig. 2 is a longitudinal section. Fig. 3 is an end view. Fig. 4 is a detail in perspective, showing the mechanism for operating the shutters or valves. Fig. 5 is an enlarged section, showing the pins and the cords for operating the journal-shafts G.

This apparatus is more especially designed for the desiccation of fruit, raisins, &c.; and it consists of two parallel chambers, A B, which may be divided into compartments, if desired, by transverse partitions having suitable valves or openings through which the air may pass. The trays upon which the fruit is placed may be mounted upon trucks or carriages running transversely upon rails, so as to be easily introduced or removed. A closed diaphragm or partition separates the two compartments longitudinally, and they may be made as long as is found desirable. At one end is the heating apparatus C, by which the air is heated, and at this end the screw-bladed blowers D are journaled, being driven by any suitable machinery, so as to revolve in opposite directions in the openings between the heater C and the chambers A B. At the opposite end of the chambers A B is a transverse passage, E, which unites them, so that the air from one chamber may pass through this passage into the other.

F are doors or valves, which are hinged vertically in the passage between the heater C and the chambers A B. These doors are united by a rod or cord, G, having an elastic or spring portion, H, in some portion of its length, and they may have a rod or cord connected with one or both, by which they are moved. The movement of these doors will then be simultaneous, and when one of them stands so as to allow the passage from the heater to its chamber A to be opened the other one will close the passage from the heater to the chamber B, and will leave an open passage from this chamber to the escape or discharge; and by swinging the two doors to the opposite side the position of the openings will be reversed. As the connecting rod or cord G is made a little short, the elastic portion or spring H serves to draw the inner door close against its jamb, so as to insure a close joint at this point when the doors have been moved to either side. When the doors are standing in the position here described, the machinery being in operation, the fans D will act to draw the air from the heater and force it through the chamber B and discharge it, so that the air thus passes around the entire circuit through the passage E at the rear end.

In order to properly distribute the air as it passes from the chamber A into the passage E, and from the passage E into the chamber B, or the reverse, and prevent the tendency of the air to pass in the shortest direction, thus leaving dead-points in the chambers, I employ a series of vertical blinds or slats, J, which are made of narrow strips fitted in guides or channels at the top and bottom. These strips are set a short distance apart, those near the central partition being placed nearer together and those near the outside being more widely separated, so that the tendency of the air to pass into the space or passage E in the central partition will be corrected, and the air will be delivered equally over the whole width of the chambers, and will pass out of the passage in the same manner into the other chamber. When the air has been run from chamber A into the chamber B for a certain length of time, the current is reversed by changing the doors or valves F, and the direction of motion of the fan-wheels and the current will then pass through the chamber B from the heater, and thence back to the discharge-openings through the chamber A. This corrects the tendency of the fruit to dry more rapidly at one end than at the other. These reverse currents also have the additional advantage that the fruit which is first subjected to the highest degree of heat is afterward subjected to the lesser degree by the reversal of the current, while that at the opposite end is subjected to the higher degree of heat when this reversal takes place. It also enables me to apply the current of heat first to one side of the fruit and afterward to the opposite side, and this is especially advantageous in drying raisins or other fruit which are in bunches or clusters.

In order to regulate the heat and keep the air at a proper degree of dryness through the chambers, I employ a hygrometer, which will indicate the amount of moisture and dryness in the air which is being discharged, so that I may regulate it and not saturate the air too fully before it reaches the discharge, and at the same time not allow it to be discharged in a condition where it shall lose the advantage of its dryness.

K, L, and M are a series of concentric pipes extending longitudinally from end to end of the drier. The intermediate pipe, L, which lies between the outer and inner one, is connected with the discharge-chamber N of the apparatus, so that the moist warm air which is delivered from the drying-chambers is caused to pass out through this pipe. As the air which supplies the heater is being drawn in the opposite direction through the other pipes, the discharging air gradually imparts a portion of its heat to the incoming air, so that the latter will be delivered to the heaters at a considerably higher temperature than if it were drawn directly in, thus economizing in the amount of fuel which would be necessary to raise it to the proper temperature.

In some cases it may be advisable to discharge the moist air which escapes from the drier beneath the grate of the heating apparatus. In this case the chamber containing the heater has openings by which exterior fresh air is admitted, and after being heated passes into the drying-chambers, being drawn thence into the outer air through the flue or chimney; or it may be wholly or partially drawn into the heaters, as before stated.

It is desirable to operate the mechanism connected with my apparatus automatically, and in order to do this I employ a mechanism by which the doors or valves F may be moved so as to reverse the currents through the chambers at stated or regular intervals. The cord G, by which the doors are connected, may be extended beyond them upon each side. At one side this cord passes over a pulley, O, so as to be returned, and the two ends are then carried around a pulley, P, between guide-rollers, and may be wound around this pulley a sufficient number of times to prevent the cord from slipping, so that when the pulley is turned in one direction the cord will be moved so as to move the doors about their hinges to open and close one set of passages, and when moved in the other direction the operation will be reversed. Another pulley, Q, is fixed to the shaft of the pulley P, and a belt, R, passes from this pulley around to the pulley S. A small hub, T, is fixed upon the shaft of the pulley S, and this has two projecting arms or lugs, U and V.

W is a belt, which passes around pulley X, and has a projecting lug or block, Y, fixed to it. The pulley X' is upon the shaft Z, which is caused to rotate by suitable connections.

Upon the shaft Z are pulleys $a$, with the usual direct and cross belts by which change of motion is communicated.

The fan-blowers D, by which the current is produced, are operated from the shaft $c$, and when the doors are changed the rotation of this shaft and blowers is also reversed.

The operation of this device will then be as follows: The shaft Z, revolving in one direction, carries the pulley X and belt W, which moves slowly, and when the lug Y upon this belt arrives at the arm U in its passage it causes the pulley S to revolve by its action on this arm, and through it the pulley P, thus winding and unwinding the cord G, so as to shift the position of the valves or doors F at the same time that a belt-shifting device, $d$, which is fixed upon one edge of the belt R, acts upon the belts passing between the pulleys $a$ and $b$, so as to change the direction of motion of the shaft $c$, and through it that of the fan-blowers D. The belt W may pass as far as may be desired below the pulley S, returning upon the other side of the pulley X, around which it passes. The lug or block Y will strike the other arm, V, which projects from the hub F, and will rotate the pulleys S and P in the opposite direction from that which was given on the first movement, thus reversing the position of the gates or valves F, and also the movement of the fan-blowers. The belt W may travel at any desired rate of speed, so as to produce these changes at any desired interval of time. The passages through which the air passes are, as before stated, divided into compartments by transverse partitions having valves or openings through which the air may pass, and these valves or openings, which are shown in an enlarged form at $e$, are adjustable to the different angles, so as to correct the tendency of the heated air to rise to the top of the chambers, thus distributing it more evenly from top to bottom. It will be manifest that the position of these shutters when the air is passing in one direction through the chambers will be opposite to that which is required when it is passing in the opposite direction.

In order to change the direction of these shutters, I have a vertically-moving rod or bar, $f$, which stands near the journal shafts upon which the shutters turn, and these journal-shafts $g$ have cords $h$ wound around them, making one or more turns from opposite sides, and their ends are carried in opposite directions and connected to the vertical rod $f$ by means of pins I, or other suitable device. The rod $f$ is connected by a bell-crank lever, $j$, with the rod or bar $k$, which extends alongside the drier, so that when this rod $k$ is moved in one direction or the other all the rods $f$ will be moved up or down by the action of their bell-crank levers $j$. This will cause the journal-shafts $g$ to revolve, and by pulling on the cords $h$ will turn the vanes or shutters $e$, so that they will be caused to stand at an angle in either one direction or the other, according to the direction of the current of air through the chambers. As the lower shutters must be turned to a greater angle than those which are higher up, the cords which pass around the journal-shafts $g$ of the lowermost shutters may be drawn tight, the second one may be left a little slack, and the third a little more so, and so on to the uppermost one, which requires but little variation. It will be seen that when the rod $f$ is moved it acts upon the lowermost shutter, $e$, to turn it exactly in proportion to its own motion, while the uppermost one is only moved a short distance after the slack in its cord is taken up.

In some cases it may be desirable to produce a draft through the chambers without setting the rotary fan-wheels in motion. For this purpose I employ a pipe, $o$, one end of which opens into the drying-chamber, while the opposite end leads into the draft-space of the furnace, so that when communication is opened through this pipe air will be drawn through it, passing from the drying-chamber to the furnace and thence to the chimney.

Having thus described my invention, what I claim as new, and desire to secure by Letters Patent, is—

1. The transverse partitions having the valves or shutters which are adjustable to stand at different angles, so as to give a varying horizontal direction to the passing air, in combination with connecting rods or arms and levers by which the position of the shutters may be changed when the air-currents are reversed, substantially as herein described.

2. The vertical strips or slats arranged in series in the chambers A and B, near their junction with the transverse passage E, said strips forming openings or spaces which are widest at the sides and decrease toward the center, in combination with the lateral valves or shutters, substantially as herein described.

3. In a drier, the parallel chambers, connected at one end and having their opposite adjacent ends connected with the heater and blast apparatus by passages or openings, in combination with the pair of doors or gates F, swinging upon hinges having a vertical axis and having an elastic connection, whereby the doors are caused to swing simultaneously to open communication from one of the chambers to the heater and from the other to the discharge and to form a tight joint, substantially as herein described.

In witness whereof I have hereunto set my hand.

A. BLATCHLY.

Witnesses:
S. H. NOURSE,
H. C. LEE.